(12) United States Patent
Mohammad et al.

(10) Patent No.: US 11,287,166 B2
(45) Date of Patent: Mar. 29, 2022

(54) EVAPORATIVE COOLING SYSTEM FOR AN HVAC SYSTEM

(71) Applicant: Johnson Controls Technology Company, Auburn Hills, MI (US)

(72) Inventors: Mujibul R. Mohammad, Kakinada (IN); Anil V. Bhosale, District Satara (IN); Baskaran K, Chennai (IN); Neelkanth S. Gupte, Katy, TX (US)

(73) Assignee: Johnson Controls Technology Company, Auburn Hills, MI (US)

( * ) Notice: Subject to any disclaimer, the term of this patent is extended or adjusted under 35 U.S.C. 154(b) by 198 days.

(21) Appl. No.: 16/263,678

(22) Filed: Jan. 31, 2019

(65) Prior Publication Data

US 2020/0208887 A1   Jul. 2, 2020

Related U.S. Application Data

(60) Provisional application No. 62/787,656, filed on Jan. 2, 2019.

(51) Int. Cl.
*F25B 39/04* (2006.01)
*F25B 13/00* (2006.01)
(Continued)

(52) U.S. Cl.
CPC ............ *F25B 39/04* (2013.01); *F24F 13/222* (2013.01); *F25B 13/00* (2013.01); *F25B 2339/047* (2013.01); *F28D 2021/007* (2013.01)

(58) Field of Classification Search
CPC .......... F24D 19/0082; F24D 6/02; F24D 6/06; F24D 6/16; F24D 2013/202; F24D 1/42;
(Continued)

(56) References Cited

U.S. PATENT DOCUMENTS 3,592,451 A * 7/1971 McDuffee ................. F24F 6/04
261/103
3,913,345 A * 10/1975 Goettl ..................... F24F 1/022
62/183

(Continued)

FOREIGN PATENT DOCUMENTS

KR   20170103054    *  3/2016  ............... F24F 1/14
WO   2008055981 A1    5/2008
WO   2015164919 A1   11/2015

OTHER PUBLICATIONS

English Translation of KR20170103054A (Year: 2016).*
(Continued)

*Primary Examiner* — David J Teitelbaum
(74) *Attorney, Agent, or Firm* — Fletcher Yoder, P.C.

(57) ABSTRACT

Embodiments of the present disclosure relate to a condenser assembly for a heating, ventilation, and/or air conditioning (HVAC) system that includes a condenser coil having a plurality of tubes configured to flow a refrigerant therethrough for heat transfer between the refrigerant and a flow of air passing across the plurality of tubes, and a porous material having a plurality of fluid retaining passages, in which the plurality of fluid retaining passages is configured to receive a fluid and enable the flow of air to pass through the porous material and transfer of thermal energy to between the fluid and the flow of air. The porous material is disposed upstream of the condenser coil with respect to the flow of air such that the flow of air passes through the porous material before passing across the plurality of tubes.

27 Claims, 7 Drawing Sheets

(51) Int. Cl.
*F24F 13/22* (2006.01)
*F28D 21/00* (2006.01)

(58) Field of Classification Search
CPC .............. F24D 6/04; F24D 2013/225; F24D 2006/146; F25B 2339/021; F25B 39/02; F25B 39/04; F24F 6/02; F24F 6/06; F24F 6/16; F24F 2013/202; F24F 1/42; F24F 6/04; F24F 2013/225; F24F 2006/146; F24F 2006/046

See application file for complete search history.

(56) References Cited

U.S. PATENT DOCUMENTS

| | | | | |
|---|---|---|---|---|
| 4,182,131 A | * | 1/1980 | Marshall | F24F 5/001 62/305 |
| 4,290,274 A | * | 9/1981 | Essex | F24F 3/14 236/46 F |
| 7,263,852 B2 | * | 9/2007 | Bacchus | F25B 39/04 62/305 |
| 9,933,170 B2 | * | 4/2018 | Wong | F24F 1/42 |
| 2005/0056042 A1 | | 3/2005 | Bourne et al. | |
| 2005/0279115 A1 | | 12/2005 | Lee et al. | |
| 2008/0083239 A1 | | 4/2008 | Meyer | |
| 2011/0023506 A1 | | 2/2011 | Day et al. | |
| 2015/0204626 A1 | * | 7/2015 | Martell | F28C 3/08 165/200 |
| 2017/0030597 A1 | * | 2/2017 | Crespo-Calero | F24F 13/20 |
| 2017/0097166 A1 | | 4/2017 | Morris | |

OTHER PUBLICATIONS

Trane, Packaged Rooftop Air Conditioners IntelliPak II—S*HJ, Product Catalog, Oct. 7, 2014, 206 pgs.
Daikin, RoofPak Singlezone, Heating and Cooling Systems with Evaporative Condensers, Catalog 219-2, 2016, 76 pgs.

* cited by examiner

EVAPORATIVE COOLING SYSTEM FOR AN HVAC SYSTEM

CROSS REFERENCE TO RELATED APPLICATIONS

This application claims priority from and the benefit of U.S. Provisional Application Ser. No. 62/787,656, entitled "EVAPORATIVE COOLING SYSTEM FOR AN HVAC SYSTEM", filed Jan. 2, 2019, which is hereby incorporated by reference in its entirety for all purposes.

BACKGROUND

The present disclosure relates generally to heating, ventilation, and/or air conditioning (HVAC) systems, and specifically, to an evaporative cooling system for an HVAC system.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments. The HVAC system may control the environmental properties through control of a supply air flow delivered to and ventilated from the environment. For example, the supply air flow may be placed in thermal communication with a refrigerant of an HVAC system. The refrigerant may be directed through the HVAC system to exchange heat with the supply air flow. In some embodiments, an ambient air flow, such as air from an external environment, may also be directed through the HVAC system. The HVAC system may include a heat exchanger that places the ambient air flow in thermal communication with the refrigerant to enable heat exchange between the ambient air flow and the refrigerant. However, an operating efficiency of the heat exchanger may be limited when the ambient air flow entering the HVAC system is at certain conditions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a condenser assembly for a heating, ventilation, and/or air conditioning (HVAC) system includes a condenser coil having a plurality of tubes configured to flow a refrigerant therethrough for heat transfer between the refrigerant and a flow of air passing across the plurality of tubes, and a porous material having a plurality of fluid retaining passages, in which the plurality of fluid retaining passages is configured to receive a fluid and enable the flow of air to pass through the porous material and transfer of thermal energy to between the fluid and the flow of air. The porous material is disposed upstream of the condenser coil with respect to the flow of air such that the flow of air passes through the porous material before passing across the plurality of tubes.

In another embodiment, a heating, ventilation, and/or air conditioning (HVAC) system includes a housing configured to enclose a condenser coil having a plurality of tubes configured to flow a refrigerant therethrough for heat transfer between the refrigerant and a flow of air passing across the plurality of tubes. The HVAC system further includes a porous material having a plurality of fluid retaining passages configured to retain a fluid, in which the porous material is positioned upstream of the condenser coil with respect to the flow of air, a pump configured to direct the fluid toward the porous material, and a controller configured to control the pump to adjust a flow of the fluid toward the porous material.

In another embodiment, a heating, ventilation, and/or air conditioning (HVAC) system includes a first heat exchanger having a coil and a housing configured to enclose the coil, a porous material coupled to the housing, a condensate reservoir configured to receive condensate generated by a second heat exchanger of the HVAC system, and a fluid outlet fluidly coupled to the condensate reservoir, in which the fluid outlet is configured to output the condensate as at least a portion of the fluid onto the porous material. The coil includes a plurality of tubes configured to flow a refrigerant therethrough for heat transfer between the refrigerant and an air flow passing across the plurality of tubes, and the porous material is positioned upstream of the coil with respect to the air flow, the porous material having a plurality of fluid-retaining passages configured to receive a fluid.

DRAWINGS

Various aspects of this disclosure may be better understood upon reading the following detailed description and upon reference to the drawings in which.

Figure 6:
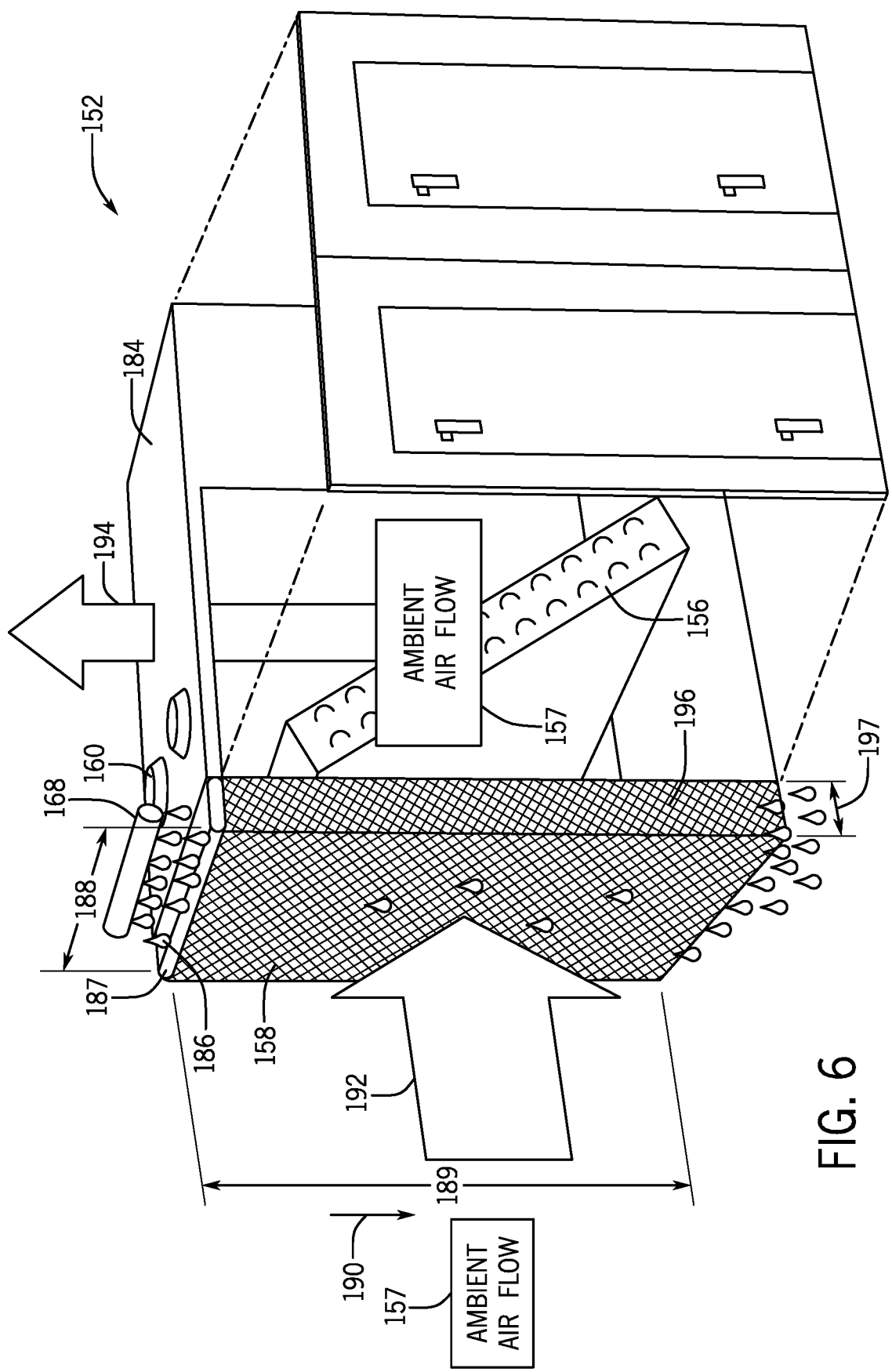
Figure 7:
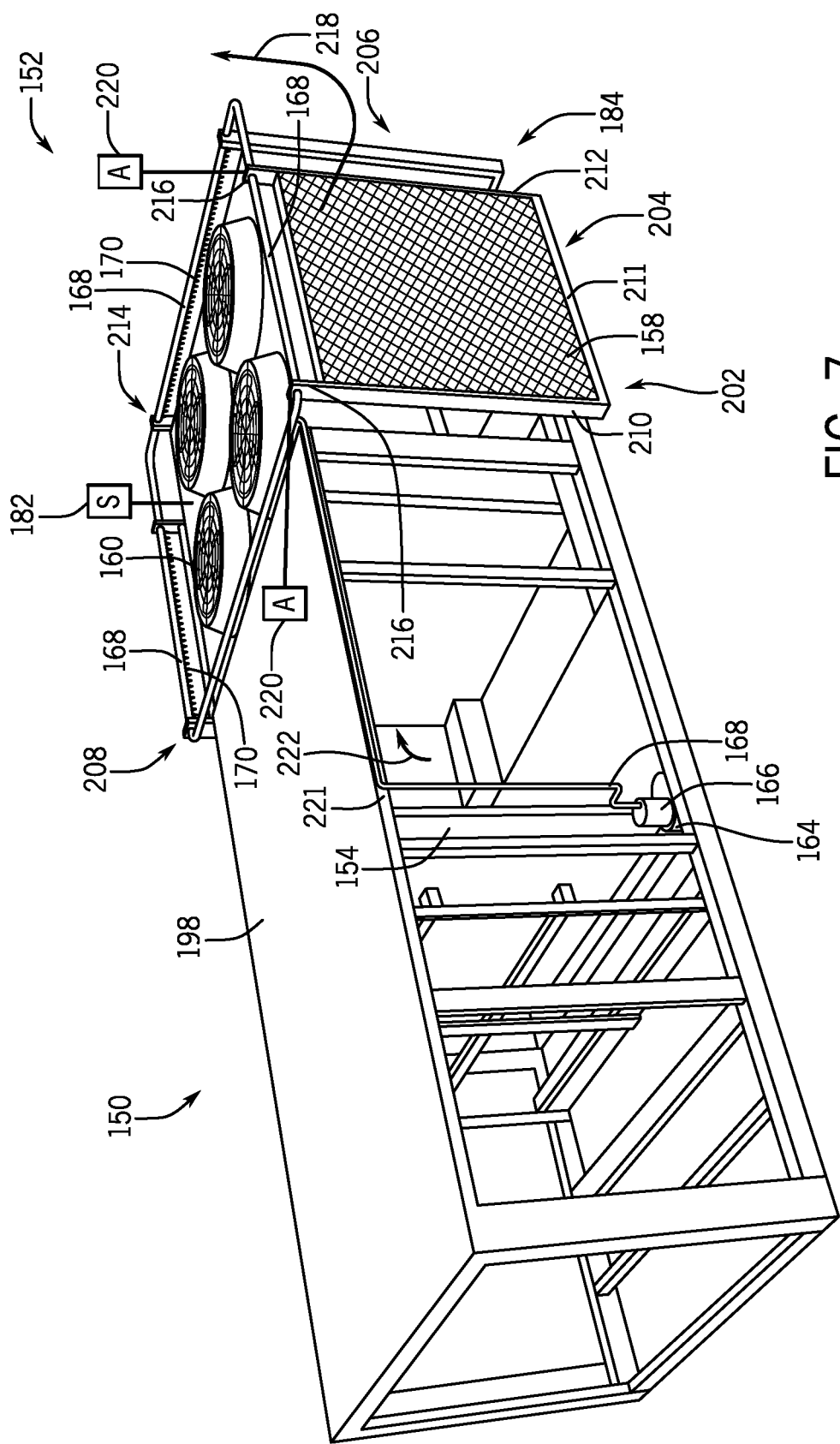

FIG. 6 is a perspective view of an embodiment of a heat exchanger including the porous material configured to condition an air flow directed through the heat exchanger, in accordance with an aspect of the present disclosure; and FIG. 7 is a perspective view of an embodiment of the HVAC system including the porous material configured to condition the air flow, in accordance with an aspect of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to heating, ventilation, and/or air conditioning (HVAC) systems that use a refrigerant to condition a supply air flow. As used herein, a "supply air flow" refers to an air flow that is conditioned by the HVAC system and is then delivered to a space or to spaces cooled, heated, and/or otherwise conditioned by the HVAC system. For example, the HVAC system may cool the supply air flow and then direct the cooled supply air flow to the space to reduce a temperature of the space. The HVAC system may receive the supply air flow as return air from the space and/or as air from an environment external to the HVAC system and/or the space. Furthermore, as used herein, an "ambient air flow" refers to an air flow that may be used by the HVAC system to exchange heat with the refrigerant but that is not directed to the space. In other words, the ambient air flow and the supply air flow may be different from one another. By way of example, the ambient air flow may be used to remove heat from the refrigerant of the HVAC system and may then be exhausted to an ambient environment and/or another environment different from the space.

The HVAC system may include a first heat exchanger, such as an evaporator, that is configured to receive the refrigerant and place the refrigerant in thermal communication with the supply air flow. In particular, the first heat exchanger may enable heat from the supply air flow to transfer to the refrigerant, thereby cooling the supply air flow. The resulting heated refrigerant may then be directed to a second heat exchanger, such as a condenser, that is configured to receive and cool the heated refrigerant. For example, the refrigerant may be placed in thermal communication with the ambient air flow using the second heat exchanger to enable transfer of heat from the refrigerant to the ambient air flow. The resulting cooled refrigerant may be directed back to the first heat exchanger, where the refrigerant may further remove heat from the supply air flow.

In some embodiments, a performance or efficiency of the second heat exchanger may be affected by a property of the ambient air flow. As an example, a greater amount of heat transfer between the refrigerant and the ambient air flow may occur with the second heat exchanger discussed above when the ambient air flow is received from an external environment having a relatively low temperature. In other words, a greater amount of heat transfer between the ambient air and the refrigerant occurs in the second heat exchanger when a temperature differential between the refrigerant and the ambient air flow increases. It should be understood that further reducing a temperature of the refrigerant via heat transfer with the ambient air flow at the second heat exchanger may enable the refrigerant to remove a greater amount of heat from the supply air flow in the first heat exchanger. In this manner, performance of the HVAC system may be based on properties, such as a temperature, of the ambient air flow. In some instances, when the ambient air flow is above a threshold temperature and/or above a threshold humidity, performance of the HVAC system may be limited. For example, a greater amount of energy may be consumed by the HVAC system, such as to operate the compressor, to lower a temperature of the supply air flow to a target level when the ambient air flow is at certain conditions.

Thus, in accordance with certain embodiments of the present disclosure, it is presently recognized that reducing a temperature of the ambient air utilized to cool or condense refrigerant flow may enhance a performance of the HVAC system. For example, the HVAC system may include a porous material, such as a sheet of porous material, across which the ambient air flow is directed before the ambient air reaches the second heat exchanger. The porous material may retain a cooling fluid, such as water, that removes heat from the ambient air flow and thereby lowers the temperature of the ambient air flow. The cooled ambient air flow may then be placed in thermal communication with the refrigerant to remove heat from the refrigerant via the second heat exchanger. In this manner, the porous material may increase heat transfer between the ambient air flow and the refrigerant, thereby improving the performance of the HVAC system. That is, a cooler ambient air flow may generally remove more heat from the refrigerant than a warmer ambient air flow at the second heat exchanger, thereby enabling a cooler refrigerant to exchange heat with the supply air flow at the first heat exchanger, which may increase the efficiency of the HVAC system. Thus, the porous material may reduce a cost to operate the HVAC system.

This disclosure primarily discusses the porous material as having a plurality of fluid retaining passages configured to retain a cooling fluid. Each fluid retaining passage is also configured to enable the ambient air flow to pass through the porous material and further toward the HVAC system. When the ambient air flow passes through a fluid retaining passage of the porous material, the ambient air flow may be placed in direct thermal communication with the cooling fluid retained in the fluid retaining passage via evaporative cooling. That is, the cooling fluid may absorb thermal energy from the ambient air and may thereby evaporate from a liquid to a vapor. As such, the cooling fluid absorbs heat from the ambient air flow and reduces a temperature of the ambient air flow. In some embodiments, the porous material may be a conditioning pad that may retain fluid but may not include or may include significantly smaller passages through which ambient air passes. In such embodiments, the ambient air flow may be directed across the conditioning pad to be placed in thermal communication with the cooling fluid. After being directed across the conditioning pad, the cooled ambient air flow may be guided around, instead of through, the conditioning pad and further toward the HVAC system.

Additionally, this disclosure primarily discusses the present techniques in the context of a porous material positioned upstream of the second heat exchanger, such as the condenser, of the HVAC system to pre-cool the ambient air flow. However, in other embodiments, the porous material may additionally or alternatively be implemented elsewhere in the HVAC system to improve performance of the HVAC system. For example, the porous material may be positioned upstream of the first heat exchanger, such as the evaporator, of the HVAC system to pre-cool the supply air flow.

Figure 1:
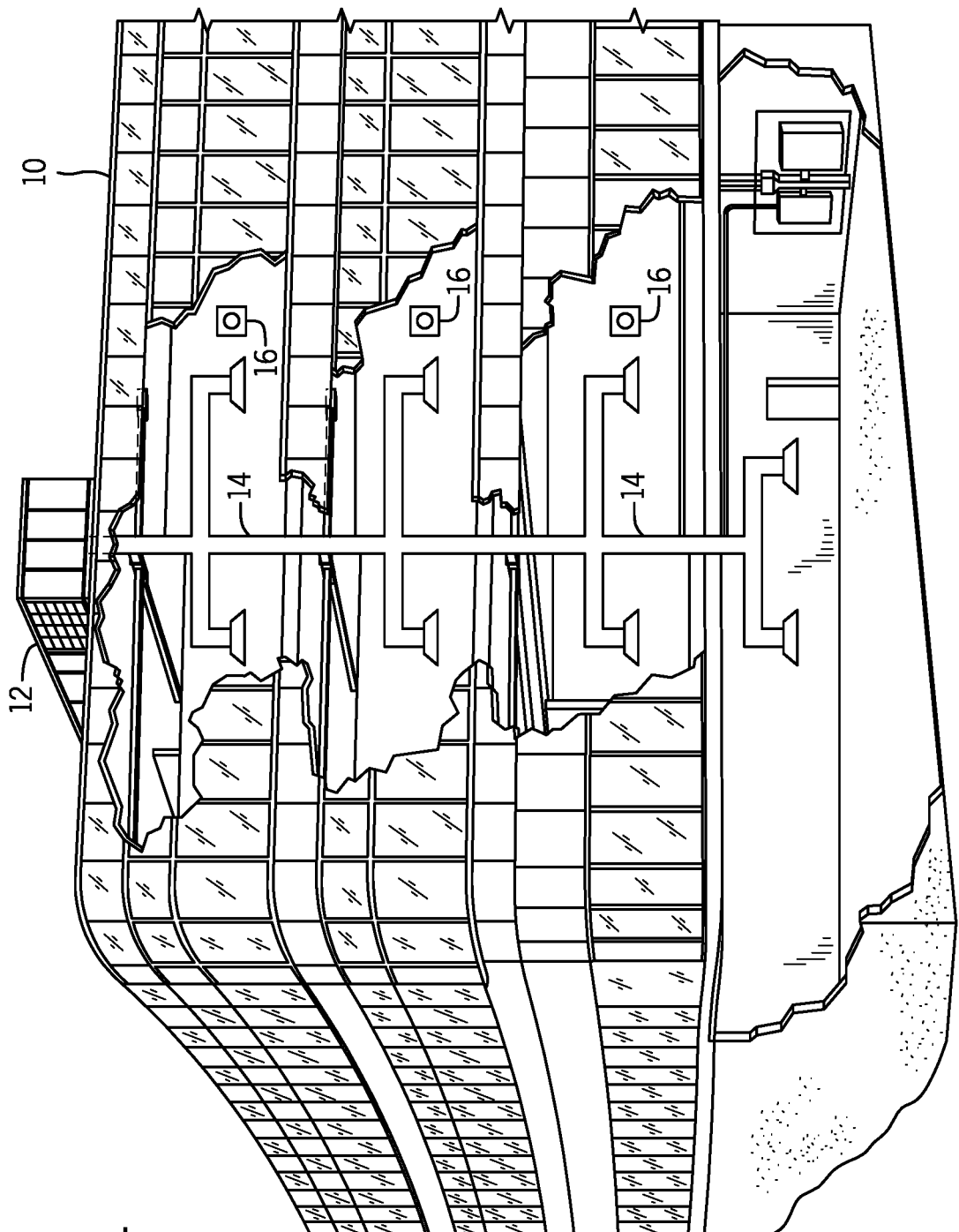
FIG. 1 is a schematic of an embodiment of heating, ventilation, and/or air conditioning (HVAC) system for building environmental management that may employ one or more HVAC units, in accordance with an aspect of the present disclosure.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor unit 58 and an indoor unit 56.

The HVAC unit 12 is an air cooled device that implements a refrigeration cycle to provide conditioned air to the building 10. Specifically, the HVAC unit 12 may include one or more heat exchangers across which a supply air flow is passed to condition the supply air flow before the supply air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
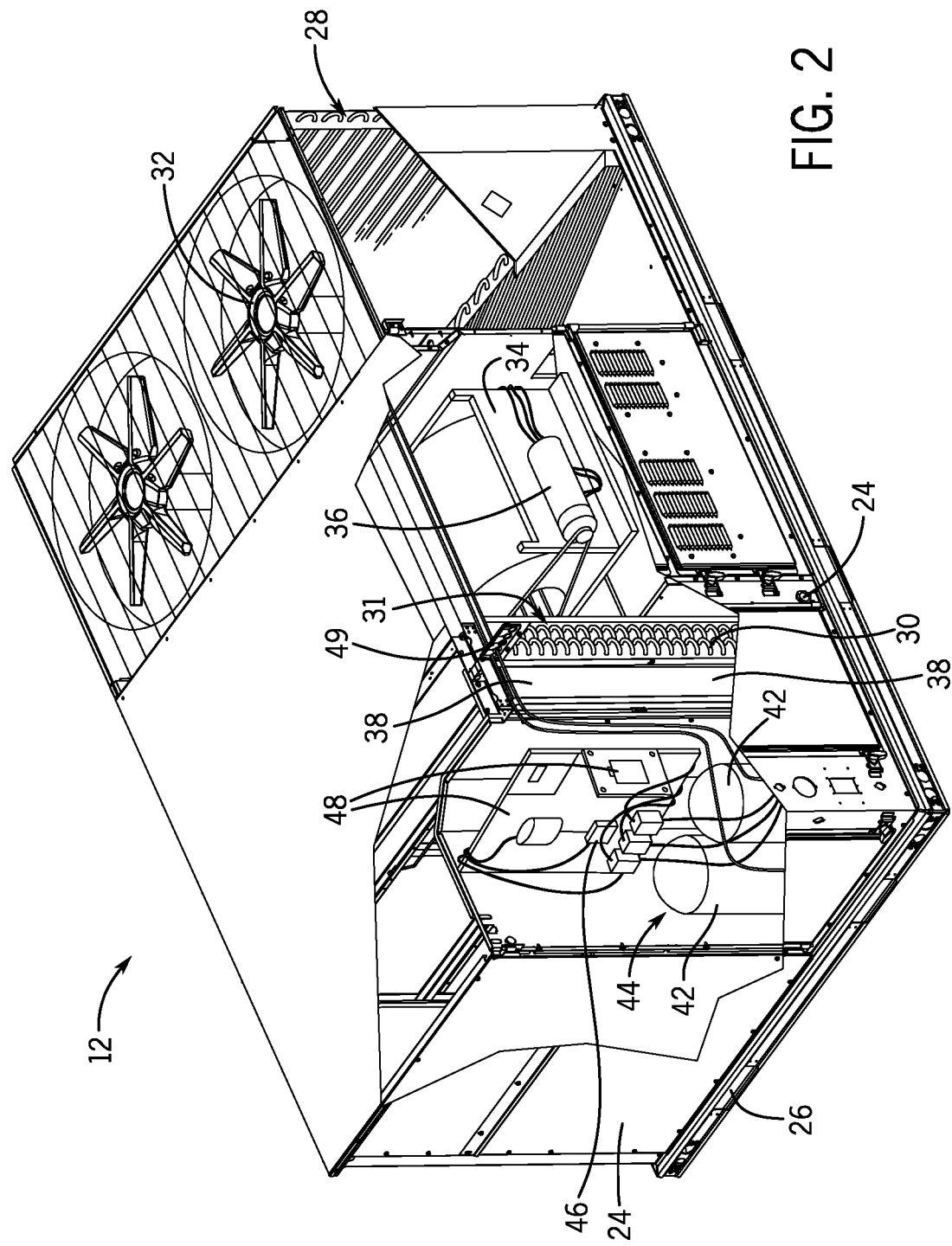
FIG. 2 is a perspective view of an embodiment of a packaged HVAC unit that may be used in the environmental control system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of conditioning functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of conditioning. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
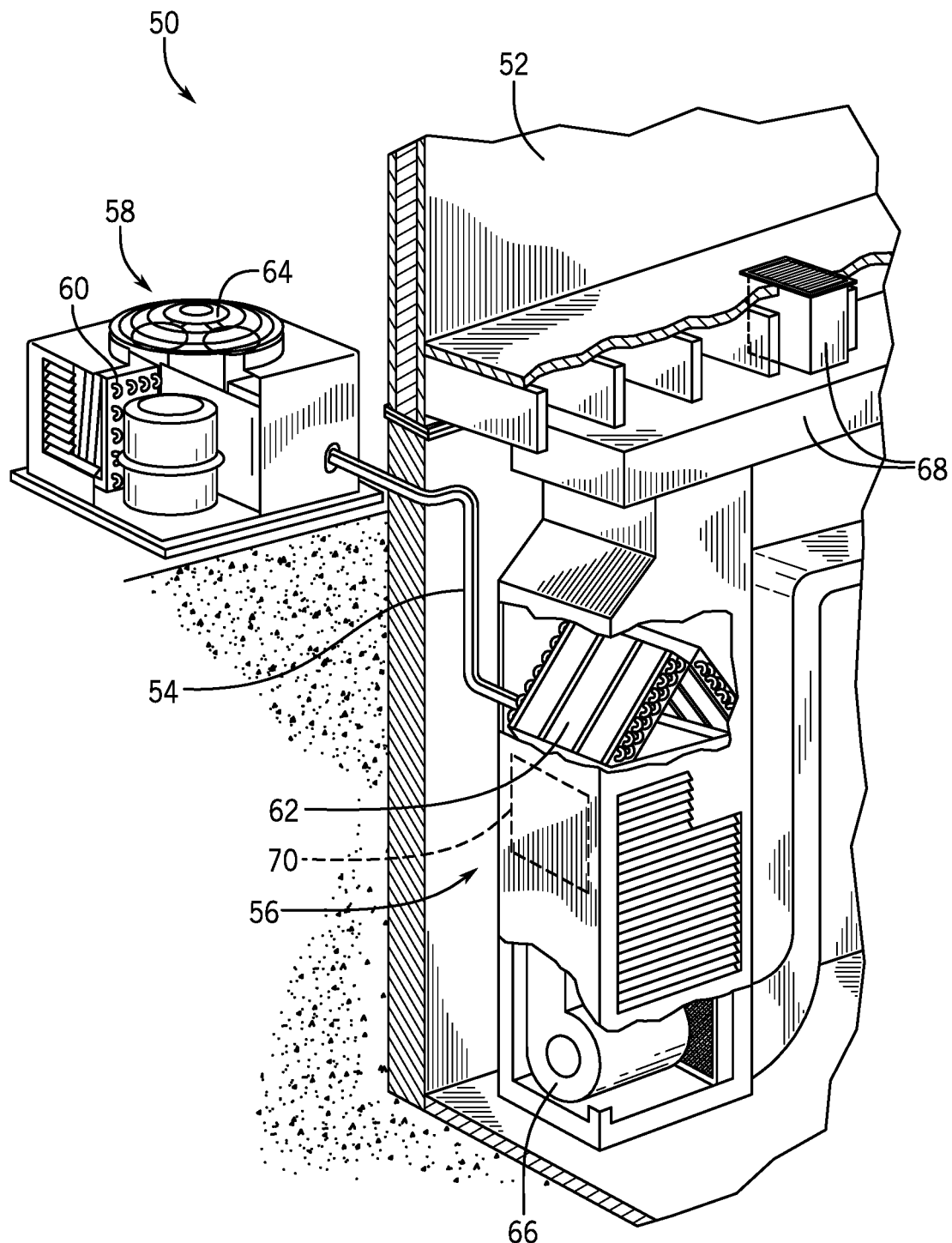
FIG. 3 is a schematic of an embodiment of a residential, split heating and cooling system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
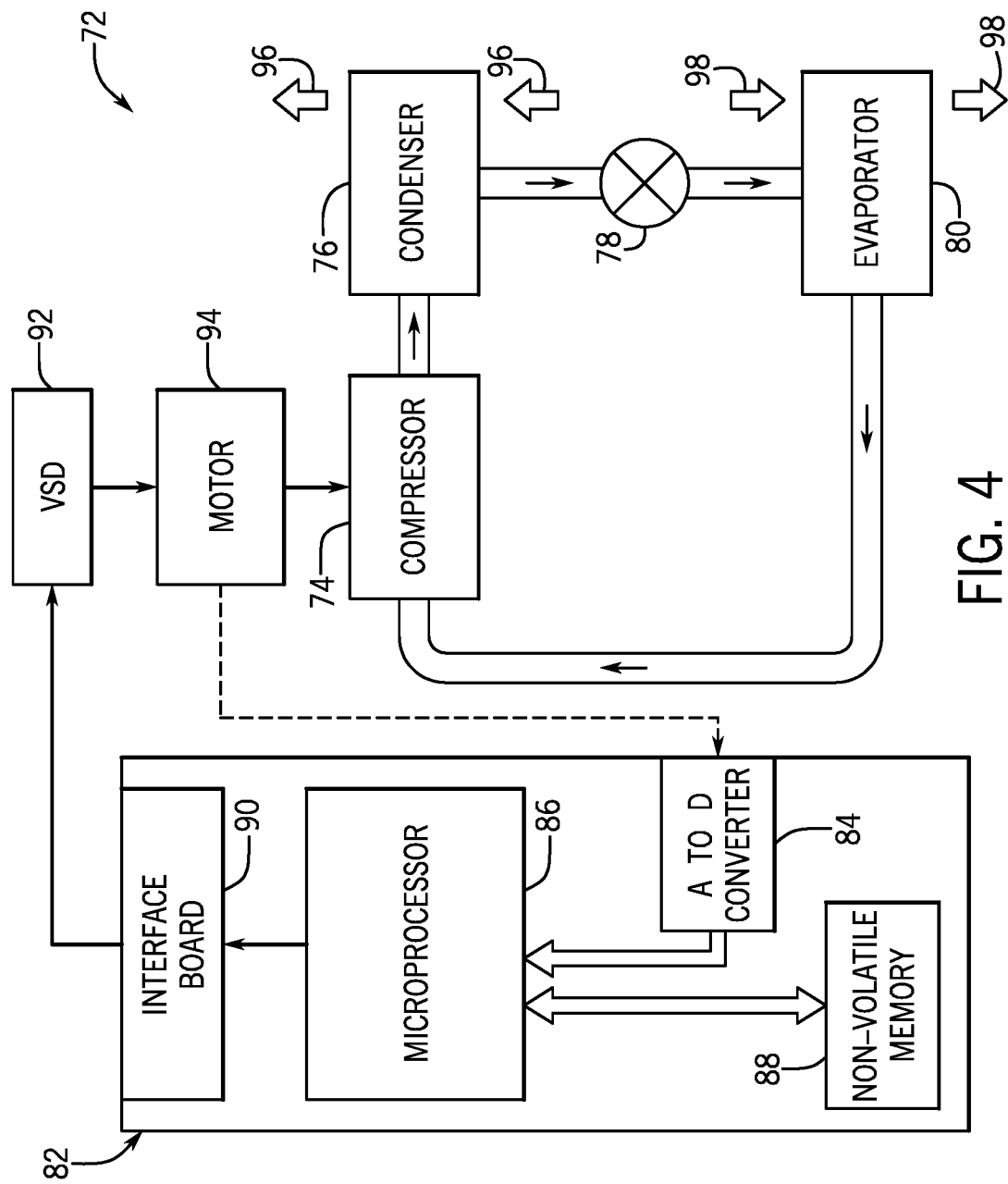
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As set forth above, a porous material may be employed by any of the HVAC systems of FIGS. 1-4 to cool an ambient air flow before the ambient air flow is directed across a heat exchanger. In one example, the porous material may be implemented in a rooftop unit, such as in the HVAC unit 12, and the porous material may be positioned adjacent to the heat exchanger 28 and/or the heat exchanger 30. In another example, the porous material may be implemented in a split HVAC system, such as in the residential heating and cooling system 50, and the porous material may be positioned adjacent to the outdoor HVAC unit 58. In any case, the porous material may pre-condition or cool the ambient air flow before the ambient air flow is directed through the HVAC system, thereby increasing heat transfer between the ambient air flow and the refrigerant flowing through the HVAC system. As a result, performance of the HVAC system may be improved.

In certain embodiments, the porous material may use a cooling fluid that exchanges heat with the ambient air flow directed through and/or across the porous material. In some embodiments, the cooling fluid may include condensate formed and collected during operation of the HVAC system. As an example, the supply air flow directed through the HVAC system may be cooled at a particular portion of the HVAC system. Condensate may form as a result of water within the supply air flow condensing as the supply air flow is cooled, and the condensate may be captured and directed to a reservoir. The condensate may be directed, such as via a pump of the HVAC system, from the reservoir to the porous material. In this manner, the porous material may be used without having to implement an additional fluid source to supply cooling fluid to the porous material.

Figure 5:
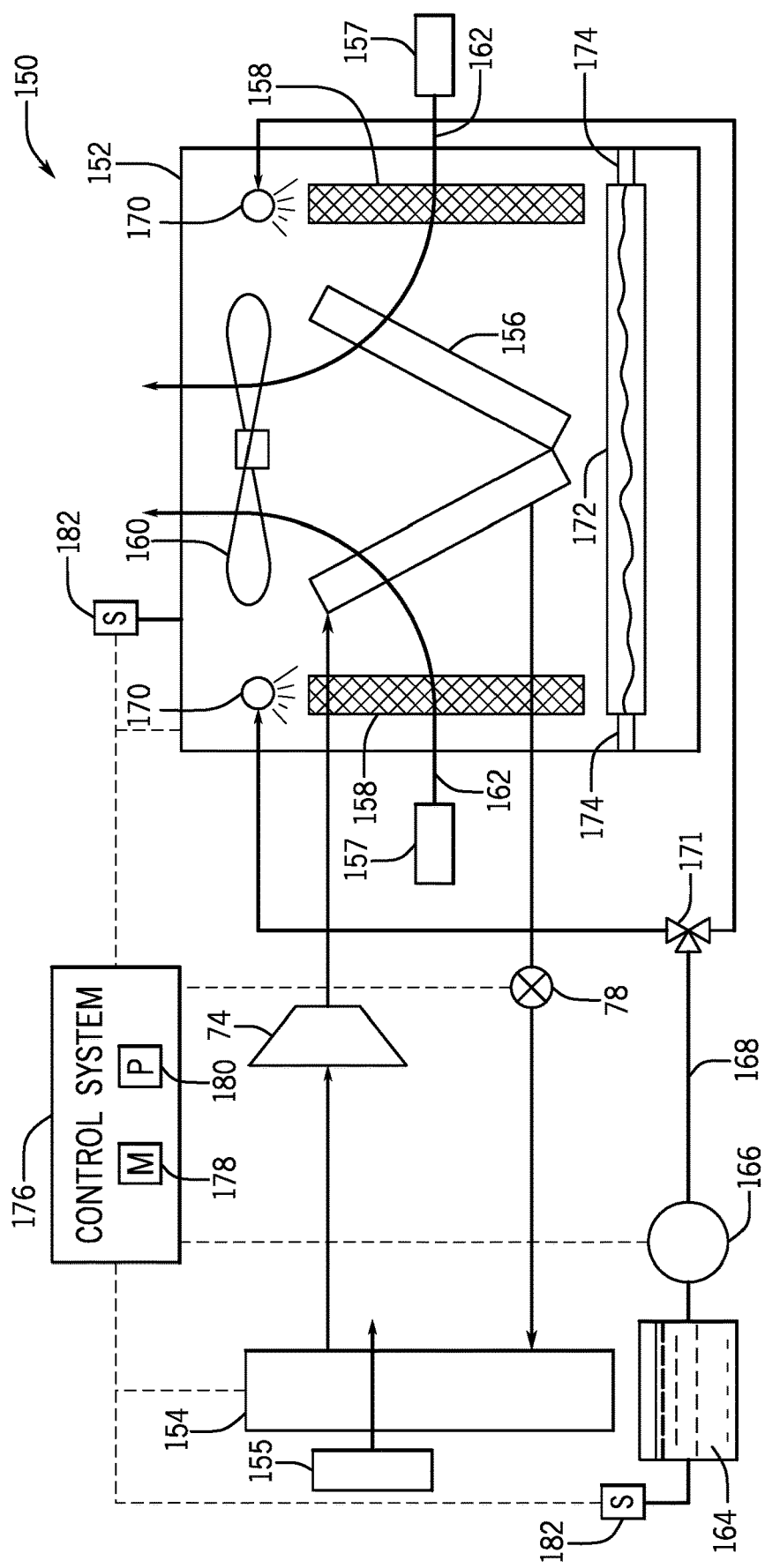
FIG. 5 is a schematic of an embodiment of an HVAC system that includes porous material configured to condition an air flow, in accordance with an aspect of the present disclosure.

FIG. 5 is a schematic of an embodiment of an HVAC system 150 that includes a first heat exchanger 152 and a second heat exchanger 154 disposed along a refrigerant flow path. Refrigerant may be circulated between the first heat exchanger 152 and the second heat exchanger 154 via the compressor 74, for example, disposed along the refrigerant flow path. Heat may be transferred to the refrigerant within the second heat exchanger 154 from a supply air flow 155 directed or forced across the second heat exchanger 154, thereby heating and increasing a temperature of the refrigerant. In some embodiments, the HVAC system 150 includes the compressor 74 configured to receive the refrigerant from the second heat exchanger 154. The compressor 74 may increase a pressure of the refrigerant, which may further increase the temperature of the refrigerant, and may direct the heated and pressurized refrigerant to the first heat exchanger 152. A coil 156 of the first heat exchanger 152 is configured to place the refrigerant in thermal communication with an ambient air flow 157 directed across the first heat exchanger 152 to cool the refrigerant. In one example, the coil 156 may include tubes configured to flow the refrigerant therethrough and place the refrigerant in thermal communication with the ambient air flow 157 passing across the tubes. As used herein, tubes include channels, conduits, flow passages, or other components configured to flow refrigerant through the coil 156. Although FIG. 5 depicts the coil 156 as arranged in a V-shape, it should be understood that the coil 156 may be arranged in any suitable orientation, such as a vertical or a horizontal orientation, and any suitable number of coils 156 may be used. In any case, cooled refrigerant exiting the first heat exchanger 152 may be expanded by the expansion valve or device 78 to decrease a pressure of the refrigerant, which may further decrease the temperature of the refrigerant. The cooled and depressurized refrigerant may then be directed back to the second heat exchanger 154 to exchange heat with the supply air flow 155.

In the illustrated embodiment of FIG. 5, the first heat exchanger 152 includes porous material 158 positioned adjacent to the coil 156. The porous material 158 may have various geometries, shapes, and/or configurations. For example, the porous material 158 may be formed as a sheet, a panel, a membrane, a block, a sheet, or other mass or configuration of porous material 158. The porous material 158 may be positioned upstream of the coil 156 with respect to the ambient air flow 157. As such, the ambient air flow 157 may be cooled by the porous material 158 prior to exchanging heat with the refrigerant. Although FIG. 5 illustrates two formations or sections of porous material 158, it should be understood that there may be any suitable number of porous material 158 sections, segments, or formations disposed in the HVAC system 150.

In certain embodiments, the HVAC system 150 may include a fan 160, which may be a component of the first heat exchanger 152. When in operation, the fan 160 may draw ambient air from an environment external to the HVAC system 150 to generate the ambient air flow 157 and direct the ambient air flow 157 along an ambient air flow path 162. That is, the fan 160 may direct the ambient air flow 157 through the porous material 158, which cools the ambient air flow 157, such as via evaporative cooling. The cooled ambient air may be directed across the coil 156 downstream of the porous material 158 relative to the ambient air flow path 162, and heat may be transferred from the refrigerant to the ambient air flow 157. The ambient air flow 157 may then be directed out of the first heat exchanger 152 and the HVAC system 150, such as to the external environment.

As set forth above, the porous material 158 may retain a cooling fluid to condition or cool the ambient air flow 157. For example, the cooling fluid may include condensate formed via heat transfer between the supply air flow 155 and the refrigerant in the second heat exchanger 154. The supply air flow 155 may include water vapor, which may be cooled and may condense when flowing across the second heat exchanger 154, thereby forming condensate. The condensate may be directed from the second heat exchanger 154 to a condensate reservoir 164. In some embodiments, the condensate reservoir 164 may be disposed underneath the second heat exchanger 154 to collect condensate flowing off the second heat exchanger 154 via gravitational force. In an additional or alternative embodiment, the condensate reservoir 164 may be disposed in a different position, and condensate formed on the second heat exchanger 154 may be directed to the condensate reservoir 164 via a drain conduit or another suitable flow directing structure.

The HVAC system 150 may include a pump 166 fluidly coupled to the condensate reservoir 164, where the pump 166 is configured to direct the condensate from the condensate reservoir 164 to the first heat exchanger 152. By way of example, the pump 166 may generate a suction pressure to draw condensate from the condensate reservoir 164 and cause the condensate to flow through a conduit 168. The conduit 168 may direct the condensate to outlets 170 that emit the condensate as cooling fluid onto the porous material 158. The outlets 170 may be a fluid output device that includes nozzles, sprayers, sprinklers, dripper systems, wicks, orifices, another suitable component to emit the condensate onto the porous material 158, or any combination thereof. In the illustrated embodiment, the outlets 170 are positioned above the porous material 158 to emit the cooling fluid in a substantially downward direction onto the porous material 158, such as via gravitational force. In other embodiments, the outlets 170 may be positioned differently such that the outlets 170 emit the cooling fluid upwards, at an angle, or in any suitable manner that directs the condensate onto the porous material 158.

In other embodiments, the HVAC system 150 may not include the condensate reservoir 164 and/or the pump 166. For example, the conduit 168 may be configured to couple to a fluid source, such as a cold water supply of a building, which may be utilized to supply the cooling fluid. The conduit 168 may thus include a valve 171 that may adjust a flow of the cooling fluid toward the outlets 170. In still further embodiments, the conduit 168 may be configured to receive the cooling fluid from multiple sources, such as via control of a plurality of valves. As such, the outlets 170 may receive the condensate, an external fluid, and/or another suitable fluid as the cooling fluid. In some embodiments, the fluid source may be used to supply the outlets 170 with cooling fluid when an insufficient amount of condensate has been collected in the condensate reservoir 164, and/or to adjust a composition of the condensate or cooling fluid emitted by the outlets 170.

The HVAC system 150 may also include a cooling fluid drain 172 configured to collect cooling fluid that is not absorbed by the ambient air flow 157 and not retained within the porous material 158. Similar to the condensate reservoir 164, the cooling fluid drain 172 may collect cooling fluid from the porous material 158 via gravitational force and/or via a drain conduit directing cooling fluid from the porous material 158 to the cooling fluid drain 172. The cooling fluid may be removed from the cooling fluid drain 172 via a channel 174. In some embodiments, the channel 174 may remove the cooling fluid from the HVAC system 150. In additional or alternative embodiments, the channel 174 may recycle the cooling fluid, such as by redirecting the collected cooling fluid through the conduit 168 to enable the cooling fluid to be outputted by the outlets 170 onto the porous material 158.

The HVAC system 150 may further include a control system 176, such as the control board 47 and/or the control panel 82, configured to control operation of certain components of the HVAC system 150. The control system 176 may include a memory 178 and a processor 180. The memory 178 may be a mass storage device, a flash memory device, removable memory, or any other non-transitory computer-readable medium that includes instructions for the processor 180 to execute. The memory 178 may also include volatile memory such as randomly accessible memory (RAM) and/or non-volatile memory such as hard disc memory, flash memory, and/or other suitable memory formats. The processor 180 may execute the instructions stored in the memory 178, in order to adjust operation of the components of the HVAC system 150.

As an example, the control system 176 may be configured to control operation of the compressor 74, the expansion valve or device 78, the first heat exchanger 152, the second heat exchanger 154, and/or the pump 166. In some embodiments, the control system 176 may adjust an amount of cooling fluid emitted onto the porous material 158. For example, the HVAC system 150 may include sensors 182, such as flow sensors or temperature sensors, which are communicatively coupled to the control system 176. In particular embodiments, the sensors 182 may provide feedback or data indicative of an operating parameter of the HVAC system 150, such as a temperature of the supply air flow 155, a target temperature of the supply air flow 155, a temperature of the refrigerant in the first heat exchanger 152 and/or the second heat exchanger 154, a pressure of the refrigerant in the first heat exchanger 152 and/or the second heat exchanger 154, an amount of fluid in the condensate reservoir 164, another operating parameter, or any combination thereof. The sensors 182 may additionally or alternatively provide feedback indicative of a parameter of the external environment, such as a temperature of the external environment, a pressure of the external environment, a temperature of the ambient air flow 157, a pressure of the ambient air flow 157, a humidity of the ambient air flow 157, another suitable parameter, or any combination thereof.

The control system 176 may adjust the amount of cooling fluid directed onto the porous material 158 by adjusting a speed of the pump 166, a speed of the fan 160, operation of the outlets 170, such as a discharge opening of the outlets 170, and/or a position of the valve 171 based on feedback from the sensors 182. For example, the control system 176 may increase a speed of the pump 166 to increase a flow rate of the cooling fluid onto the porous material 158 when a temperature of the ambient air flow 157 increases. Increasing a flow rate of the cooling fluid may increase an amount of cooling fluid that may exchange thermal energy with the ambient air flow 157 and further reduce a temperature of the ambient air flow 157.

It should be appreciated that the HVAC system 150 may include additional or alternative components not illustrated in FIG. 5. Furthermore, components may be arranged in a different manner than illustrated in FIG. 5, such as at different locations sections of the HVAC system 150 relative to one another.

FIG. 6 is a partial perspective view of an embodiment of the first heat exchanger 152 having the porous material 158 in a sheet or pad configuration. The first heat exchanger 152 may include a housing 184 within which the coil 156 may be positioned. The ambient air flow 157 may flow into the housing 184 and be directed into the first heat exchanger 152 to pass over the coil 156. In the illustrated embodiment, the conduit 168 is configured to emit a cooling fluid 186 toward the porous material 158. For example, the outlets 170 of the illustrated embodiment are integrated with the conduit 168 and may spray, mist, drip, or otherwise release the cooling fluid 186 in another suitable manner, or any combination thereof, onto the porous material 158. However, it should be understood that in some embodiments, the conduit 168 may be a separate component, such as a nozzle, mister, sprayer, and the like, coupled to the conduit 168 and configured to direct the cooling fluid 186 from the conduit 168 onto the porous material 158. In certain embodiments, the conduit 168 may be configured to emit the cooling fluid 186 onto a top portion 187 of the porous material 158 across a length 188 of the porous material 158. In this manner, gravitational force may direct the cooling fluid 186 to flow along a height 189 of the porous material 158 in a cooling fluid direction 190 across the porous material 158.

The ambient air flow 157 may pass through the porous material 158 into the first heat exchanger 152 generally in a first air flow direction 192. That is, the ambient air flow 157 outside of the housing 184 of the first heat exchanger 152 may be drawn and/or forced into the housing 184 of the first heat exchanger 152 via the fan 160 in the first air flow direction 192. As the ambient air flow 157 passes through the porous material 158, the cooling fluid 186 and/or the porous material 158 may absorb thermal energy from the ambient air flow 157, thereby cooling the ambient air flow 157. Additionally or alternatively, the thermal energy absorbed by some of the cooling fluid 186 from the porous material 158 may evaporate and mix with the ambient air flow 157, thereby increasing a moisture composition of the ambient air flow 157. As such, after passing through the porous material 158, the ambient air flow 157 may have a reduced temperature. The ambient air flow 157 may then be directed or forced across the coil 156 of the first heat exchanger 152 via the fan 160 to exchange heat with the refrigerant. For example, the ambient air flow 157 may absorb thermal energy from the refrigerant, thereby reducing a temperature of the refrigerant and increasing a temperature of the ambient air flow 157. After exchanging heat with the refrigerant, the ambient air flow 157 may be directed out of the first heat exchanger 152 in a second ambient air flow direction 194. Generally, the ambient air flow 157 may be directed away from the first heat exchanger 152 and out of the housing 184 via the fan 160.

Each section or portion of porous material 158 may enable the ambient air flow 157 to pass through to the coils 156. For example, the porous material 158 may have a plurality of fluid retaining passages 196 to permit flow of the ambient air flow 157 through the porous material 158. In some embodiments, the fluid retaining passages 196 may include contiguous systems of porous pockets of the porous material 158 that the ambient air flow 157 may pass through. Each fluid retaining passage 196 of the plurality of fluid retaining passages 196 may receive and/or collect the cooling fluid 186 directed across the porous material 158. That is, the cooling fluid 186 may be emitted onto the porous material 158 anywhere along the length 188 and/or a thickness 197 of the porous material 158. As the cooling fluid 186 flows along the porous material 158, each fluid retaining passage 196 may retain a portion of the cooling fluid 186. In this manner, the ambient air flow 157 directed through the plurality of fluid retaining passages 196 may directly contact the cooling fluid 186, thereby enabling heat exchange between the ambient air flow 157 and the cooling fluid 186. In particular embodiments, the fluid retaining passages 196 may include pathways configured to direct the fluid along the height 189 of the porous material 158 and/or along the length 188 of the porous material 158. That is, the fluid retaining passages 196 may distribute the fluid throughout the porous material 158, thereby enabling the ambient air flow 157 to be in contact with a greater amount of the fluid as the ambient air flow 157 passes through the porous material 158. In certain embodiments, the fluid retaining passages 196 may be arranged as a grid, a web, a mesh, another suitable arrangement, or any combination thereof, in the porous material 158. In additional or alternative embodiments, the porous material 158 may be perforated and include the fluid retaining passages 196 formed therethrough, such as via punching, pressing, drilling, cutting, boring, or otherwise puncturing the porous material 158. In additional or alternative embodiments, the porous material 158 may include wire, thread, fiber, filament, and the like, arranged to form the fluid retaining passages 196, such as in a crosshatch pattern.

Furthermore, the porous material 158 may include a material that facilitates retention of the cooling fluid 186 within the fluid retaining passages 196 of the porous material 158. The material of each porous material 158 section or segment may also enable a structure of the porous material 158 to resist alteration, such as expansion or corrosion, caused by the cooling fluid 186. As an example, the porous material 158 may include a resin, a polymer, a composite material, or any combination thereof.

Moreover, the structure or configuration of the fluid retaining passages 196 may also facilitate retention of the cooling fluid 186 and/or may promote or increase contact between the ambient air flow 157 and the cooling fluid 186. For example, as shown in the illustrated embodiment of FIG. 6, the porous material 158 may include multiple fluid retaining passages 196 that are disposed adjacent to one another along the thickness 197 of the porous material 158 and with respect to the first air flow direction 192. As such, columns of fluid retaining passages 196 are formed within the porous material 158. Further, adjacent fluid retaining passages 196 or adjacent columns of fluid retaining passages 196 may be offset from one another with respect to the length 188 of the porous material 158, such that a structure of the porous material 158 may overlap with a respective fluid retaining passage 196 in the first air flow direction 192. The offset of the fluid retaining passages 196 may increase an amount of the cooling fluid 186 that the fluid retaining passages 196 receive and collect. Further still, the ambient air flow 157 may not flow linearly or uniformly through the porous material 158. Instead, the ambient air flow 157 may be forced to change directions generally along the first air flow direction 192 in order to pass through adjacent fluid retaining passages 196. This may enable the ambient air flow 157 to contact more of the cooling fluid 186, and thus, engage in additional heat transfer. In other embodiments, the porous material 158 may include a single column of fluid retaining passages 196 along the thickness 197 of the porous material 158, such that the ambient air flow 157 may flow directly through the porous material 158 without obstruction.

In any case, as the ambient air flow 157 passes through the fluid retaining passages 196 of the porous material 158, the ambient air flow 157 may come into contact with the cooling fluid 186. As a result, heat may be directly transferred from the ambient air flow 157 to the cooling fluid 186. Furthermore, the flow of the ambient air flow 157 may mix evaporated cooling fluid 186 with the ambient air flow 157. In other words, the cooling fluid 186 may be carried by the ambient air flow 157, thereby increasing a moisture or humidity content of the ambient air flow 157.

FIG. 7 is a perspective view of an embodiment of the HVAC system 150 having the porous material 158. The illustrated HVAC system 150 may be considered a single packaged unit, such as the HVAC unit 12, and has an enclosure 198 that includes both the first heat exchanger 152 and the second heat exchanger 154. In FIG. 7, certain parts of the HVAC system 150, such as walls and panels, have been removed to illustrate certain components of the HVAC system 150. Although the illustrated embodiment depicts the enclosure 198 as having a generally rectangular shape, the enclosure 198 may have any suitable shape that includes the first heat exchanger 152 and/or the second heat exchanger 154.

The HVAC system 150 may include the housing 184 described above disposed at a section of the enclosure 198. The housing 184 may thermally separate the first heat exchanger 152 from the second heat exchanger 154 and/or from an environment external to the HVAC system 150. In this manner, the ambient air flow 157 may pass through the housing 184 and into the first heat exchanger 152. The HVAC system 150 may also include frames 202 configured to receive and secure a respective sections of the porous material 158 to the housing 184. As shown in FIG. 7, the housing 184 includes respective frames 202 positioned at a first side 204 of the first heat exchanger 152, a second side 206 of the first heat exchanger 152, and a third side 208 of the first heat exchanger 152, in which each frame 202 may receive a separate porous material 158. However, it should be understood that the housing 184 may include frames 202 positioned in other arrangements relative to the first heat exchanger 152 and/or multiple frames 202 positioned at any of the sides 204, 206, 208 of the first heat exchanger 152. The frames 202 may position the porous material 158 such that the ambient air flow 157 directed through the first heat exchanger 152, such as via the fan 160, passes through the porous material 158 before flowing into the housing 184. As such, the ambient air flow 157 is pre-conditioned by the porous material 158 before being directed across the coil 156 and exchanging heat with the refrigerant.

FIG. 7 illustrates each frame 202 as having a first frame segment 210, a second frame segment 211, and a third frame segment 212 arranged in a substantially U-shaped and/or rectangular configuration. In other embodiments, each frame 202 may include any number of frame segments 210, 211, 212 arranged in any suitable orientation. Each section of porous material 158 may be shaped to enable the porous material 158 to fit within the frame segments 210, 211, 212. As such, at least a portion of the perimeter of the porous material 158 may be coupled to and abut the frame segments 210, 211, 212.

The conduit 168 may be offset from an external surface of the housing 184 at a fourth side 214, such as a top side, of the first heat exchanger 152. In certain embodiments, the fan 160 may also be disposed at the fourth side 214. As such, the conduit 168 may be positioned to avoid impeding or blocking the ambient air flow 157 directed through, or out of, the first heat exchanger 152 by the fan 160. For example, the conduit 168 and corresponding outlets 170 may extend beyond a perimeter of the fourth side 214 the first heat exchanger 152. Such positioning of the conduit 168 may also enable the conduit 168 to supply cooling fluid at each side 204, 206, 208 of the first heat exchanger 152 and onto the sections of porous material 158.

In certain embodiments, each frame 202 may be rotatably coupled to housing 184 and/or the first heat exchanger 152. For example, the first frame segment 210 and/or the third frame segment 212, may be rotatably coupled to the conduit 168 via hinged connections 216. In various embodiments, the frame 202 may be hingedly coupled to another part of the first heat exchanger 152, such as an external surface of the fourth side 214. In any case, the hinged connections 216 may enable the frame 202 and corresponding porous material 158 to rotate in a direction 218. That is, when the frame 202 and the porous material 158 is fully rotated in the direction 218, the ambient air flow 157 may be directed through the first heat exchanger 152 without passing through the porous material 158. In other words, the frame 202 and the porous material 158 may be rotated such that the ambient air flow 157 is not pre-conditioned or impeded by the porous material 158, such as when the temperature and/or humidity of the ambient air flow 157 is sufficient to exchange a target amount of heat with the refrigerant. Rotating the frames 202 may enhance an efficiency of the HVAC system 150 by reducing resistance of the ambient air flow 157 when the porous material 158 is not in use. In some embodiments, any of the frames 202 of the housing 184 may be rotated to enable the ambient air flow 157 to flow directly into the first heat exchanger 152 without passing through the porous material 158. For example, the frame 202 at the first side 204 may be rotated such that the ambient air flow 157 directed into the first heat exchanger 152 from the first side 204 does not pass through the porous material 158. However, the ambient air flow 157 directed into the first heat exchanger 152 from the second side 206 and/or the third side 208 may still pass through the respective porous materials 158.

In some embodiments, rotation of the frame 202 may be performed via the control system 176. That is, the HVAC system 150 may include actuators 220 that are communicatively coupled to the control system 176. The control system 176 may determine whether to rotate one or more of the frames 202 based on feedback from the sensors 182. For example, the sensors 182 may transmit feedback indicating that the properties of the ambient air flow 157 are sufficient for the ambient air flow 157 to exchange heat with the refrigerant without the porous materials 158. Based on the feedback, the control system 176 may activate the actuators 220 to rotate the frames 202 in the direction 218, such that the ambient air flow 157 may pass directly into the housing 184. In any case, the actuators 220 may be disposed at each side 204, 206, 208 of the first heat exchanger 152 and may be communicatively coupled to the control system 176. Thus, the control system 176 may actuate any of the actuators 220 to rotate the respective frame 202 and/or the porous material 158 of each side 204, 206, 208 of the housing 184 independently of one another.

Further, the porous material 158 may be removably coupled to the frame 202. As such, the porous material 158 may be removed from the frame 202 to enable the ambient air flow 157 to be directed into the housing 184 without passing through the porous material 158. Additionally, in this manner, the porous material 158 may be replaced, such as with a different porous material 158. Indeed, different types of porous materials 158 may be utilized to condition the ambient air flow 157. For instance, different types of porous materials 158 may retain varying amounts of cooling fluid, include different sized openings through which the ambient air flow 157 passes, include different materials, textiles, or substances, or any combination thereof. As such, the porous material 158 may be replaced to change cooling conditions generated by the porous material 158 as the ambient air flow 157 passes through the porous material 158.

It should be appreciated that, in some embodiments, the second heat exchanger 154 may be disposed at a different section of the enclosure 198 than the first heat exchanger 152. As depicted in FIG. 7, the condensate reservoir 164 and the pump 166 may be positioned below or adjacent to the second heat exchanger 154. The conduit 168 may extend from the pump 166 toward the first heat exchanger 152 along an edge 221 of the enclosure 198. As such, the pump 166 may direct condensate from the condensate reservoir 164 to the first heat exchanger 152 in a flow direction 222. In some embodiments, the conduit 168 may extend at least partially out of the enclosure 198 and away from the first side 204, so as to provide for a greater amount of available space within the enclosure 198. Additionally, there may be multiple pumps 166 and/or multiple conduits 168 extending toward the first heat exchanger 152. In any case, the condensate and/or another cooling fluid may be directed toward the first heat exchanger 152 in multiple flow directions 222 to be emitted onto the porous material 158.

It should also be appreciated that the porous material 158 may be retrofitted in certain existing systems. That is, the frame 202 with the porous material 158 may be hingedly coupled to an existing heat exchanger or HVAC system. Additionally, the condensate reservoir 164, the pump 166, and/or the conduit 168 may be implemented in existing systems to enable condensate to be directed and outputted onto the porous material 158.

Embodiments of the present disclosure may provide one or more technical effects useful in the operation of HVAC systems. For example, an HVAC system may include a porous material configured to condition an ambient air flow directed through the HVAC system. The conditioned ambient air flow may exchange heat with a refrigerant within a heat exchanger of the HVAC system. The porous material may receive a cooling fluid, such as condensate formed at a different section of the HVAC system. The porous material may be positioned to enable the ambient air flow to pass through the porous material upstream of the heat exchanger of the HVAC system with respect to a flow path of the ambient air flow. Thus, as the ambient air flow passes through the porous material, the cooling fluid may contact the ambient air flow to cool the ambient air flow, thereby increasing a temperature differential between the ambient air flow and the refrigerant. As a result, the refrigerant may be cooled more efficiently, thereby enhancing a performance of the HVAC system. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures, pressures, and so forth, mounting arrangements, use of materials, colors, orientations, and the like, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A condenser assembly for a heating, ventilation, and/or air conditioning (HVAC) system, comprising:
   a condenser coil having a plurality of tubes configured to flow a refrigerant therethrough for heat transfer between the refrigerant and a flow of air passing across the plurality of tubes;
   a condensate reservoir configured to accumulate a fluid formed via a heat exchanger of the HVAC system;
   a porous material having a plurality of fluid retaining passages, wherein the porous material is disposed upstream of the condenser coil with respect to the flow of air such that the flow of air passes through the porous material before passing across the plurality of tubes, and wherein the plurality of fluid retaining passages is configured to receive the fluid from the condensate reservoir and enable transfer of thermal energy between the fluid and the flow of air;
   a conduit fluidly coupled to the condensate reservoir, wherein the conduit is configured to direct the fluid to the plurality of fluid retaining passages; and
   a controller configured to receive data indicative of an amount of the fluid within the condensate reservoir and to adjust an opening of the conduit based on the data to adjust a flow rate of the fluid directed to the plurality of fluid retaining passages from a first flow rate to a second flow rate.

2. The condenser assembly of claim 1, wherein the plurality of fluid retaining passages includes contiguous systems of porous pockets of the porous material.

3. The condenser assembly of claim 1, wherein the plurality of fluid retaining passages includes pathways formed through the porous material, wherein the pathways are configured to direct the fluid along a length of the porous material.

4. The condenser assembly of claim 1, wherein the conduit comprises a fluid output device comprising the opening of the conduit configured to direct the fluid into the plurality of fluid retaining passages, and the controller is configured to control the fluid output device to adjust the opening.

5. The condenser assembly of claim 4, comprising a pump configured to direct the fluid from the condensate reservoir to the fluid output device.

6. The condenser assembly of claim 1, comprising a fan configured to direct the flow of air through the porous material and across the condenser coil.

7. The condenser assembly of claim 6, comprising a housing with the condenser coil and the fan disposed therein, wherein the porous material is coupled to the housing.

8. The condenser assembly of claim 7, wherein the porous material is disposed within a frame, and the frame is hingedly coupled to the housing.

9. The condenser assembly of claim 8, comprising an actuator configured to rotate the frame with respect to the housing.

10. The condenser assembly of claim 1, comprising a housing configured to direct an additional flow of air across the plurality of tubes without passing through the porous material.

11. The condenser assembly of claim 1, comprising a drain configured to receive a portion of the fluid from the porous material, wherein the drain is configured to direct the portion of the fluid away from a housing of the condenser assembly.

12. A heating, ventilation, and/or air conditioning (HVAC) system, comprising:
a housing configured to enclose a condenser coil having a plurality of tubes configured to flow a refrigerant therethrough for heat transfer between the refrigerant and a flow of air passing across the plurality of tubes;
a porous material having a plurality of fluid retaining passages configured to retain a fluid, wherein the porous material is positioned upstream of the condenser coil with respect to the flow of air;
a pump configured to direct the fluid from a condensate reservoir toward the porous material;
a sensor configured to detect a temperature of ambient air; and
a controller communicatively coupled to the sensor, wherein the controller is configured to:
receive data from the sensor, wherein the data is indicative of the temperature of ambient air;
operate the pump at a first speed to provide the fluid to the porous material at a first flow rate based on a first temperature of ambient air detected by the sensor; and
operate the pump at a second speed to provide the fluid to the porous material at a second flow rate based on a second temperature of ambient air detected by the sensor, wherein the second speed is greater than the first speed, the second flow rate is greater than the first flow rate, and the second temperature of ambient air is greater than the first temperature of ambient air.

13. The HVAC system of claim 12, wherein the controller is configured to control the pump based on a temperature of the flow of air, a target temperature of the flow of air, a temperature of the refrigerant in the condenser coil, a pressure of the refrigerant in the condenser coil, a pressure of the flow of air, a humidity of the flow of air, or any combination thereof.

14. The HVAC system of claim 13, further comprising a conduit fluidly coupled to the pump, wherein the pump is configured to direct the fluid toward the porous material via the conduit.

15. The HVAC system of claim 14, further comprising a fluid output device coupled to the conduit, wherein the fluid output device is configured to direct the fluid from the conduit onto the porous material, wherein the fluid output device comprises a nozzle, a sprayer, a mister, or any combination thereof.

16. The HVAC system of claim 15, wherein the controller is configured to adjust operation of the fluid output device to control a flow rate of the fluid directed from the conduit onto the porous material.

17. The HVAC system of claim 15, wherein the pump is configured to direct the fluid from the condensate reservoir toward the fluid output device, and wherein the controller is configured to control a speed of the pump to adjust a flow rate of the fluid directed from the condensate reservoir to the fluid output device.

18. The HVAC system of claim 12, further comprising a frame rotatably coupled to the housing, wherein the porous material is removably coupled to the frame.

19. The HVAC system of claim 18, further comprising an actuator communicatively coupled to the controller, wherein the controller is configured to instruct the actuator to rotate the frame about the housing.

20. A heating, ventilation, and/or air conditioning (HVAC) system, comprising:
a heat exchanger having a coil and a housing configured to enclose the coil, the coil having a plurality of tubes configured to flow a refrigerant therethrough for heat transfer between the refrigerant and an air flow passing across the plurality of tubes;
a porous material coupled to the housing, wherein the porous material is positioned upstream of the coil with respect to the air flow, the porous material having a plurality of fluid retaining passages configured to receive a fluid;
an additional heat exchanger configured to receive the refrigerant from the heat exchanger and to place the refrigerant in a heat exchange relationship with an additional air flow to cause generation of condensate via the additional heat exchanger;
a condensate reservoir configured to receive the condensate generated via the additional heat exchanger;
a fluid outlet fluidly coupled to the condensate reservoir, wherein the fluid outlet is configured to output the condensate as a portion of the fluid onto the porous material; and
a controller configured to receive data indicative of an amount of the condensate in the condensate reservoir and to adjust an opening of the fluid outlet to provide an adjusted flow rate of the condensate directed to the porous material based on the amount of the condensate in the condensate reservoir.

21. The HVAC system of claim 20, comprising a pump configured to direct the condensate from the condensate reservoir to the fluid outlet.

22. The HVAC system of claim 21, further comprising a sensor configured to detect an operating parameter of the HVAC system, wherein the controller is configured to receive data indicative of the operating parameter and to actuate the pump based on the data indicative of the operating parameter.

23. The HVAC system of claim 22, wherein the operating parameter includes a temperature of the air flow, a target temperature of supply air provided by the HVAC system, a temperature of the refrigerant in the heat exchanger, a temperature of the refrigerant in the additional heat exchanger, a pressure of the refrigerant in the heat exchanger, a pressure of the refrigerant in the additional heat exchanger, a pressure of the air flow, a humidity of the air flow, the amount of the condensate in the condensate reservoir, or any combination thereof.

24. The HVAC system of claim 20, wherein the heat exchanger is a condenser configured to transfer thermal energy from the refrigerant to the air flow, and the additional heat exchanger is an evaporator configured transfer thermal energy from the additional air flow to the refrigerant.

25. The HVAC system of claim 20, comprising a fan configured to draw the air flow from an ambient environment through the porous material, from the porous material into the housing and across the plurality of tubes, and from the plurality of tubes to the ambient environment.

26. The HVAC system of claim 20, comprising an additional fluid source fluidly coupled to the fluid outlet, wherein the additional fluid source is configured to provide an additional fluid to the fluid outlet.

27. The HVAC system of claim 20, further comprising a frame rotatably coupled to the housing of the heat exchanger, wherein the porous material is removably coupled to and supported by the frame.

* * * * *